Aug. 4, 1959 J. F. DENBY 2,898,584

CIRCUIT ARRANGEMENTS FOR COUNTING IMPULSES

Filed July 17, 1956 2 Sheets-Sheet 1

Inventor
JAMES FREDERICK DENBY
By
Young, Emery & Thompson
Attorneys

CIRCUIT ARRANGEMENTS FOR COUNTING IMPULSES

Filed July 17, 1956 2 Sheets-Sheet 2

Inventor
JAMES FREDERICK DENBY
By
Young, Emery & Thompson Attorneys

United States Patent Office 2,898,584

Patented Aug. 4, 1959

2,898,584

CIRCUIT ARRANGEMENTS FOR COUNTING IMPULSES

James Frederick Denby, Liverpool, England, assignor to Automatic Telephone & Electric Company Limited, Liverpool, England, a British company Application July 17, 1956, Serial No. 598,383

Claims priority, application Great Britain August 4, 1955

1 Claim. (Cl. 340—347)

The present invention relates to circuit arrangements for counting impulses and is more particularly concerned with circuit arrangements employing static switching devices, such as, for instance, cold cathode gas discharge tubes.

In automatic telephone systems it is frequently necessary to transfer information, such as digits, from one circuit to another and to facilitate this operation the digits are usually represented in coded form, for instance, by simultaneous markings over a number of leads. One form of code which is increasingly used at the present time owing to its self-checking nature, is that in which a digit is represented by markings on a particular number out of a plurality of leads, the total number of leads in the plurality being less than ten. Since the digits, which may initially represent the number of a called subscriber, are received by the equipment in decimal form, a conversion from this form to the coded form is necessary.

It is the object of the present invention to provide improved circuit arrangements for effecting such a conversion.

According to the invention, circuit arrangements for converting digits from decimal form to coded form comprise an input lead to which a train of impulses representing a digit in decimal form is applied, two interconnected counting circuits of the cold cathode tube type and a plurality of output leads each of which is individual to one of the stages of one or the other of the counting circuits, the counting circuits responding to the application of the train of impulses applied to the input lead in such a manner that one stage in each of the counting circuits is rendered operative to apply a marking to those two of the output leads which correspond to the operative stages.

Figure 1:
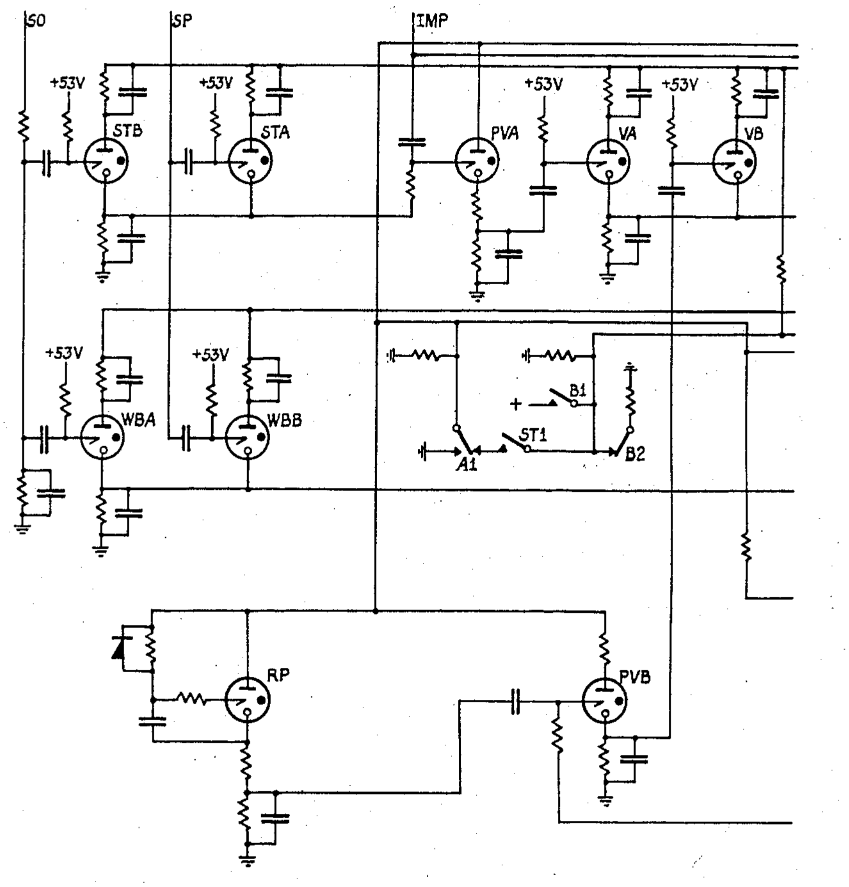
Figure 2:
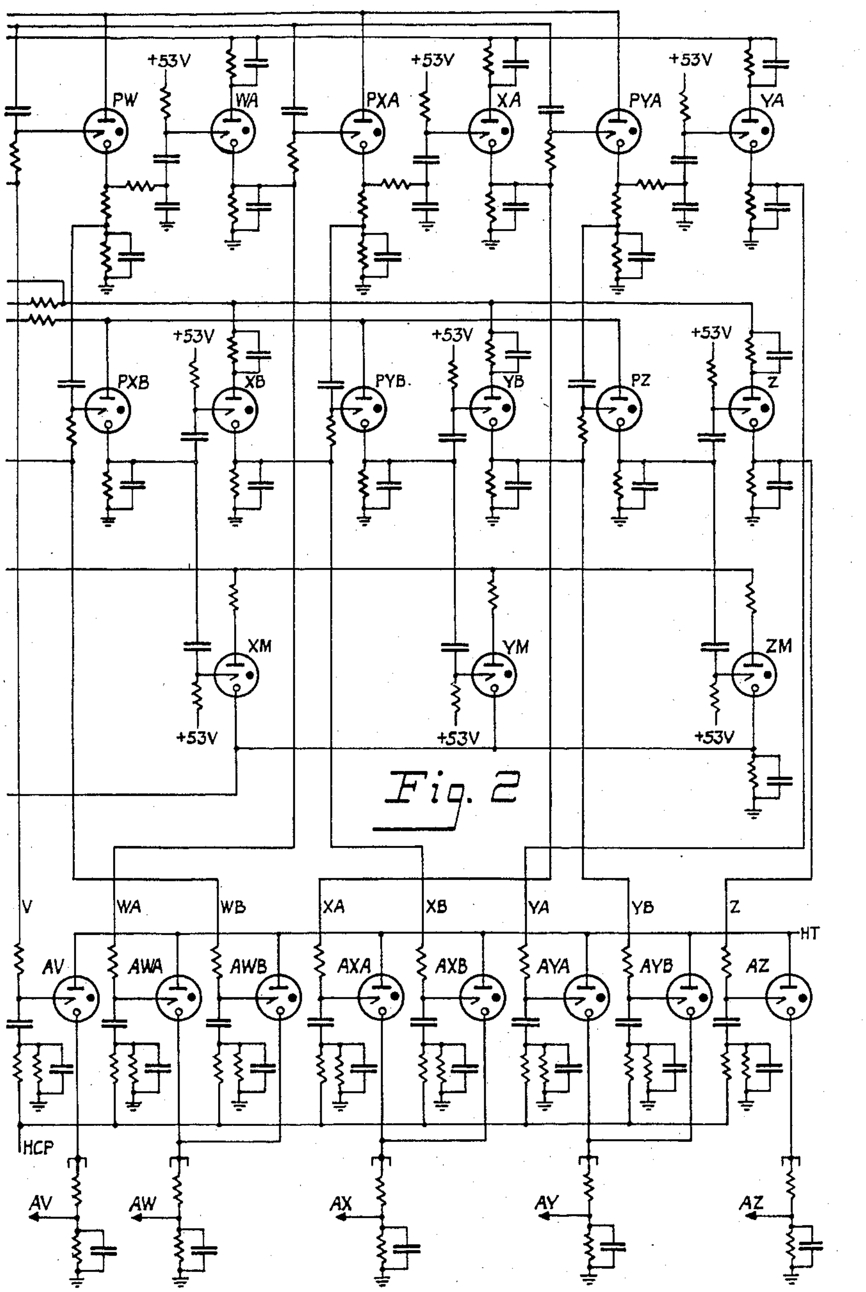

The invention will be better understood from the following description taken in conjunction with the accompanying drawings comprising Figs. 1 and 2 which, when arranged side by side with Fig. 1 on the left, show one embodiment of the circuit arrangement.

The circuit arrangement shown in the drawing forms part of a register for use in an automatic telephone system, the purpose of the register being to receive digits dialled by a calling subscriber and to retransmit the same or different digits. As far as the reception of the digits is concerned, the impulses forming each digit are counted by the circuit illustrated and at the end of the digit the count is transferred to an appropriate storage circuit for use as required. It will, however, be appreciated that the circuit arrangement is in no way limited to this particular use and there are many other arrangements to which it could be applied.

Referring to the drawing when the register is taken into use relay B (not shown) operates and connects the HT supply to certain of the tubes by closing contacts B1. Shortly after this a pulse is applied to lead SP and this causes the striking of the permanently primed tubes STA and WBB. Tube STA has a common cathode load with tube STB and similarly tube WBB has a common cathode load with tube WBA. When tube STA strikes a priming potential is applied to the trigger electrode of tube PVA while when tube WBB strikes the potential at the cathode thereof is applied to lead WB and also, as a priming potential, to the trigger electrode of tube PXB.

When the calling subscriber's line is connected through to the register, relay A (not shown) operates and at contacts A1 prevents the connection of the HT supply to certain of the tubes which would otherwise occur on the operation of relay ST. This latter relay operates shortly after relay A. The counting circuit is now in a condition to receive the impulses forming the first digit dialled by the calling subscriber and the effect of these is to cause relay A to release during each break period and to cause a pulse to be fed to the counter over lead IMP shortly afterwards.

When relay A releases the HT supply is connected over contacts ST1 and A1 to the tubes indicated and the pulse which appears on lead IMP shortly after the release of relay A, is applied to the trigger electrodes of tubes PVA, PW, PXA and PYA but of these tubes, tube PVA only is primed due to the previous striking of tube STA and therefore tube PVA only strikes. Tube PVA in striking applies a pulse to the trigger electrode of tube VA which since it is permanently primed, strikes and applies a biasing potential to the trigger electrode of tube PW. In addition tube VA in striking causes tube STA to be extinguished owing to the mutually extinguishing connection of the tube circuits and tube STA in extinguishing removes the priming potential from the trigger electrode of tube PVA. Further the striking of tube VA causes the cathode potential thereof to be applied to the lead V. Hence as a result of the reception of the first impulse of the digit, a positive potential is applied to the two leads V and WB. It will also be noted that the release of relay A on the break period of the first impulse and on the break periods of all subsequent impulses causes the HT supply to be connected to the anode and trigger electrode of tube RP. A delay network is connected in the circuit of the trigger electrode of the tube, the effect of which circuit is to delay the striking of tube RP until approximately 9 millisecs. after the application of the HT supply. This 9 millisecs. delay gives time for the operation previously described resulting from the reception of the first impulse to be completed before tube RP strikes. Tube RP in striking after the delay applies a pulse to the trigger electrode of tube PVB but at the present time this tube is not primed and does not strike.

At the end of the break period of the first impulse, relay A reoperates thereby disconnecting the HT supply from tubes PVA and RP which are therefore extinguished. Tubes VA and WBB remain conducting.

On the break period of the second impulse, relay A again releases and shortly afterwards a pulse is applied to lead IMP. Relay A again connects up the HT supply and the pulse at lead IMP is again applied to tubes PVA, PW, PXA and PYA. In this case, however, tube PVA is not primed but tube PW is primed due to the conduction of tube VA. Tubes PXA and PYA are not primed and hence the pulse over lead IMP causes tube PW only to strike. Tube PW in striking applies a pulse to the trigger electrode of the permanently primed tube WA which thereupon strikes and applies a biasing potential to tube PXA and also causes tube VA to be extinguished owing to the previously mentioned mutually extinguishing connection of the tube circuits. Further tube PW in striking applies a pulse to the trigger electrode of tube PXB, which is primed owing to the conduction of tube WBB. Tube PXB in striking applies a pulse to the trigger electrodes of the two permanently primed tubes XB and XM, both of which strike and tube XB in striking applies a priming potential to the trigger electrode of tube PYB and also causes tube WBB to be extinguished for the reason previously mentioned.

Tube XM in striking causes a priming potential to be applied to the trigger electrode of tube PVB and consequently when tube RP strikes approximately 9 millisecs. after the application of the pulse to lead IMP as previously described, a pulse is applied to the trigger electrode of tube PVB which is primed from tube XM. Tube PVB strikes and applies a pulse to the permanently primed tube VB which strikes and extinguishes tube WA. It will thus be seen that the second impulse received by the first counting circuit which comprises tubes STB, STA, PVA, VA, VB, PW, WA, PXA, XA, PYA and WA serves to advance the second counting circuit comprising the tubes WBA, WBB, PXB, XB, PYB, YB, PZ and Z to the second position whereupon owing to the striking of tube PVB, the first counter is reset to the position it assumed on the reception of the first pulse over lead IMP. At the end of the second impulse, relay A will again reoperate thereby extinguishing tubes PW, PXB, XM, RP and PVB while tubes VB and XB remain conducting. When either tube VA or VB is conducting a positive potential is applied to lead V and since tube WBB is now extinguished and tube XB is conducting, the position at the end of the reception of the second impulse is that a positive potential is applied to leads V and XB.

When relay A is again released and when the third pulse is received over lead IMP, tube PW will again strike since it is primed from the cathode of tube VB. Tube PW in striking again causes tube WA to strike and this tube again applies a priming potential to tube PXA and also causes tube VB to be extinguished. The striking of tube PW also applies a pulse to the trigger electrode of tube PXB but this tube does not now strike since tube WBB has been extinguished so that no priming potential is applied to the trigger electrode of tube PXB at this time. Tube RP also strikes after a pause of 9 millisecs. as previously explained but in this particular case, the striking of tube RP is without effect. At the end of the third impulse, the HT supply is again removed by the operation of relay A and as a result, tubes PW and RP are extinguished so that tubes WA and XB remain conducting and a positive potential is therefore applied to leads WA and XB by these tubes respectively.

On the break period of the fourth impulse the HT supply is again connected up by the release of relay A and a pulse is fed to the first counter over the lead IMP. This pulse causes tube PXA to strike since it is primed from the conducting tube WA and in striking tube PXA applies a pulse to the trigger electrode of the permanently primed tube XA which also strikes to apply a priming potential to tube PYA and to cause tube WA to be extinguished as previously described. Tube PXA in striking also applies a pulse to the trigger electrode of tube PYB which is primed due to the fact that tube XB is conducting. Tube PYB therefore strikes and applies a pulse to the trigger electrode of each of the permanently primed tubes YB and YM. Tubes YB and YM therefore strike and tube YB causes tube XB to be extinguished and also tube YB applies a priming potential to tube PZ. Tube YM in striking applies a priming potential to the trigger electrode of tube PVB. Approximately 9 millisecs. after the release of relay A, tube RP will strike and will apply a pulse to the trigger electrode of tube PVB. This tube is primed at this time because tube YM is conducting as previously explained and tube PVB in striking applies a pulse to the trigger electrode of tube VB. Tube VB strikes since it is permanently primed and applies a priming potential to the trigger electrode of tube PW. Also in striking tube VB causes tube XA to be extinguished. At the end of the fourth impulse the HT supply is again removed upon the operation of relay A and tubes RP, PVB, PXA, YM and PYB are extinguished, tubes VB and YB remaining conducting. A positive potential is thus applied to the two leads V and YB.

The first counting circuit has thus again been reset to the position it took up on the reception of the first impulse and when the next impulse is received, that is to say, the fifth impulse, the pulse applied over lead IMP to the first counter again causes tube PW to strike, relay A having released to provide the HT supply as previously explained. Tube PW in striking causes tube WA to strike thereby extinguishing tube VB. Tube RP again strikes approximately 9 ms. after the release of relay A but is ineffective at this time. At the end of the break period of the fifth impulse tubes PW and RP are extinguished while tubes WA and YB remain conducting so that a positive potential is applied to leads WA and YB.

On the reception of the sixth impulse, the pulse on lead IMP causes tube PXA to strike since this is now primed by the conduction of tube WA, relay A having again connected up the HT supply. Tube PXA in striking causes tube XA to strike thereby applying a priming potential to the trigger electrode of tube PYA and extinguishing tube WA. Tube RP again strikes approximately 9 millisecs. after the release of relay A but is again ineffective. Tube PXA is extinguished when the HT supply is removed on the operation of relay A at the end of the break period. Tubes XA and YB thus remain conducting and a positive potential is applied to lead XA and YB.

On the reception of the seventh impulse, the pulse over lead IMP causes tube PYA to strike since this is now primed from tube XA and relay A has again connected up the HT supply. Tube PYA in striking causes the permanently primed tube YA to strike thereby extinguishing tube XA. Tube PXA in striking also applies a pulse to the trigger electrode of tube PZ. Since tube YB is conducting at this time, tube PZ will be primed and accordingly it strikes when it is pulsed from tube PYA. Tube PZ in striking applies a pulse to the trigger electrode of each of the tubes Z and ZM which thereupon strike and tube ZM applies a priming potential to tube PVB. Tube RP again strikes after the HT supply has been connected for approximately 9 millisecs. and the striking of tube RP applies a pulse to the trigger electrode of tube PVB which as previously explained, is primed due to the conduction of tube ZM. Tube PVB in striking again causes tube VB to strike thereby extinguishing tube YA and applying a priming potential to tube PW. When the HT supply is removed at the end of the break period of the seventh impulse, tubes RP, ZM, PZ and PVB are extinguished, tubes Z and VB remaining conducting so that a positive potential is applied to each of leads V and Z.

On the reception of the eighth impulse, the pulse over lead IMP again causes tube PW to strike and, since the HT supply has been again connected up, the striking of this tube causes the striking of tube WA. Again the striking of this tube causes tube VB to be extinguished. The striking of tube RP 9 millisecs. after the release of relay A is again without effect. When the HT supply is removed at the end of the break period, tubes PW and RP are extinguished so that tubes WA and Z remain conducting and a positive potential is applied to leads WA and Z.

When the ninth impulse is received, the pulse on lead IMP causes tube PXA to strike, the HT having again been connected up, and this is followed by the striking of tube XA which causes tube WA to be extinguished and applies a priming potential to tube PYA. The striking of tube RP is again ineffective and when the HT supply is removed at the end of the break period, tubes PXA and RP are extinguished so that tubes XA and Z remain conducting and a positive potential is connected to leads XA and Z.

When the tenth impulse is received the HT supply is again connected on the release of relay A and the pulse on lead IMP causes tube PYA to strike followed by the striking of tube YA. Tube YA in striking extinguishes tube XA while the striking of tube RP is ineffective. At the end of the break period of the tenth impulse, the HT supply is removed and tubes PYA and RP are extinguished, tubes YA and Z remaining conducting so that a positive potential is applied to leads YA and Z.

Summarising the operation of the two counting circuits, it will be seen that the first stage (tube WBB) of the second counting circuit is operated prior to the reception of the first pulse over lead IMP. The first pulse operates the 1st stage (tube VA) of the 1st counting circuit but is without effect on the 2nd counting circuit. The second pulse operates the 2nd stage (tube WA) of the 1st counting circuit which causes the 2nd stage (tube XB) of the 2nd counting circuit to operate which results in the resetting of the 1st counting circuit so that the 1st stage (tube VB) is operated. It will be noted that tubes VA and VB have a common cathode load. The third and fourth pulses cause operation of the 2nd and 3rd stages (tubes WA and XA) of the 1st counting circuit and the operation of the 3rd stage of the 1st counting circuit causes the operation of the 3rd stage (tube YB) of the 2nd counting circuit whereupon the 1st counting circuit is again reset. The fifth, sixth and seventh pulses operate the 2nd, 3rd and 4th stages (tubes WA, XA and YA) of the 1st counting circuit and the operation of the 4th stage of the 1st counting circuit causes the operation of the 4th stage (tube Z) of the 2nd counting circuit whereupon the 1st counting circuit is again reset. The eighth, ninth and tenth pulses operate the 2nd, 3rd and 4th stages of the 1st counting circuit. The following table indicates the operations:

| Pulse on Lead IMP | Stage of 1st Counter Operated | Stage of 2d Counter Operated | Leads Marked |
|---|---|---|---|
| | | 1 (tube WBB) | WB. |
| 1 | 1 (tube VA) | | V, WB. |
| 2 | 2 (tube WA) reset to 1 | 2 (tube XB) | V, XB. |
| 3 | 2 | | WA, XB. |
| 4 | 3 (tube XA) reset to 1 | 3 (tube YB) | V, YB. |
| 5 | 2 | | WA, YB. |
| 6 | 3 | | XA, YB. |
| 7 | 4 (tube YA) reset to 1 | 4 (tube Z) | V, Z. |
| 8 | 2 | | WA, Z. |
| 9 | 3 | | XA, Z. |
| 10 | 4 | | YA, Z. |

It is obviously unnecessary to employ eight marking leads to represent the digits 1 to 0 and certain of the leads from the two counting circuits may be connected together to provide a total of five output leads. It is not possible to connect together leads WA and WB, leads XA and XB and leads YA and YB since there would then be direct connection between the two counting circuits. Preferably the eight leads from the two counters are each connected to an individual tube and the cathodes of the appropriate pairs of tubes are connected together. These tubes are shown as AV, AWA, AWB, AXA, AXB, AYA, AYB and AZ and it will be noted that a common cathode load is provided for tubes AWA and AWB, for tubes AXA and AXB and for tubes AYA and AYB.

The potentials existing on leads V, WA, WB, XA, XB, YA, YB and Z are applied as priming potentials to the tubes AV, AWA, AWB, AXA, AXB, AYA, AYB and AZ. At the termination of an impulse series a circuit (not shown) in the register becomes effective approximately 150 millisecs. after the reception of the last impulse to apply a pulse to lead HCP. This pulse is applied in parallel to the trigger electrodes of all the tubes AV, AVA, AWA, AWB, AXA, AXB, AYA, AYB, AZ but it will be appreciated that only two of these tubes will be primed whatever the value of the digit received. These two tubes accordingly strike and a positive potential will then be available at the cathodes of these tubes for application to another circuit over the appropriate ones of leads AV, AW, AX, AY and AZ. The digits 1 to 0 are thus represented by positive potential applied to two of the leads in accordance with the following table:

| Digit: | Leads marked |
|---|---|
| 1 | AV, AW |
| 2 | AV, AX |
| 3 | AW, AX |
| 4 | AV, AY |
| 5 | AW, AY |
| 6 | AX, AY |
| 7 | AV, AZ |
| 8 | AW, AZ |
| 9 | AX, AZ |
| 0 | AY, AZ |

In the particular use of the circuit arrangement in a register, it is probable that the leads AV, AW, AX, AY and AZ will be multipled to a number of storage circuits and a load circuit for each tube will be provided in each storage circuit. Each storage circuit will consist of five tubes, one for each of the five leads and a biasing potential will be applied in turn to all the tubes of each storage circuit. The positive potential on the appropriate two of the leads AV, AW, AX, AY and AZ will cause the striking of the two corresponding tubes in the storage circuit which at the time is biased. It will, however, be understood that this is only one way of making use of the positive potentials present on leads AV, AW, AX, AY and AZ.

At the end of each digit and subsequent to the transfer of the digit, a pulse is also applied to lead SO which causes the striking of the permanently primed tubes STB and WBA. Both these tubes strike and in striking extinguish the one conducting tube in each of the counters. Tube STB shares the cathode circuit of tube STA so that tube PVA is biased. Tube WBA shares the cathode circuit of tube WBB so that tube PXB is biased and a marking is extended to lead WB. Thus the counters are effectively in the same position as they were before the receipt of the first digit train and are therefore ready to receive the next digit.

I claim:

Circuit arrangements for converting digits from decimal form to coded form comprising an input lead to which a train of impulses representing a digit in decimal form is applied, a first counting circuit having a plurality of stages to which said input lead is connected and which is responsive to all the impulses, a second counting circuit having a plurality of stages controlled from said first counting circuit, means for operating the first stage of said second counting circuit prior to the application of impulses to said first counting circuit, means responsive to an impulse applied to said input lead at a time when corresponding stages in both counting circuits have been operated for operating the succeeding stage in each counting circuit, means responsive to the operation of said succeeding stage of said second counting circuit for resetting said first counting circuit to a condition where the first stage is operative and a plurality of output leads each of which is individual to one of the stages of either of said counting circuits and to each of which a potential is applied when the corresponding stage is operated.

References Cited in the file of this patent

UNITED STATES PATENTS

| | | |
|---|---|---|
| 2,369,474 | Luhn | Feb. 13, 1945 |
| 2,678,409 | Holden | May 11, 1954 |
| 2,694,801 | Bachelet | Nov. 16, 1954 |

FOREIGN PATENTS

| | | |
|---|---|---|
| 134,125 | Sweden | Jan. 8, 1952 |